Aug. 21, 1956     A. W. G. ERVINE     2,759,631
WORKPIECE ORIENTING DEVICE
Filed Sept. 5, 1952     4 Sheets-Sheet 1

INVENTOR.
ALBERT W. G. ERVINE
BY
John H. Lewis Jr.
ATTORNEYS.

Aug. 21, 1956  A. W. G. ERVINE  2,759,631
WORKPIECE ORIENTING DEVICE
Filed Sept. 5, 1952  4 Sheets—Sheet 2

INVENTOR.
ALBERT W. G. ERVINE
BY
John H. Lewis Jr.
ATTORNEYS

INVENTOR.
ALBERT W. G. ERVINE
BY
ATTORNEYS

Aug. 21, 1956     A. W. G. ERVINE     2,759,631
WORKPIECE ORIENTING DEVICE
Filed Sept. 5, 1952     4 Sheets-Sheet 4
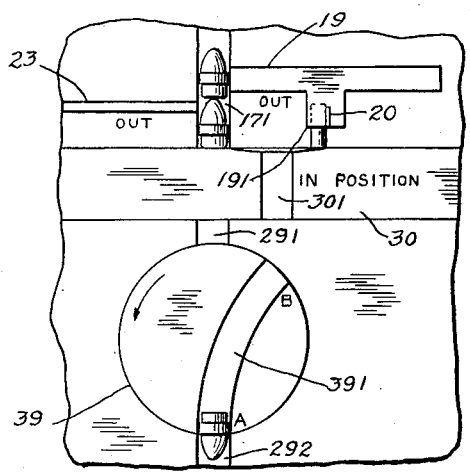
Fig. 9
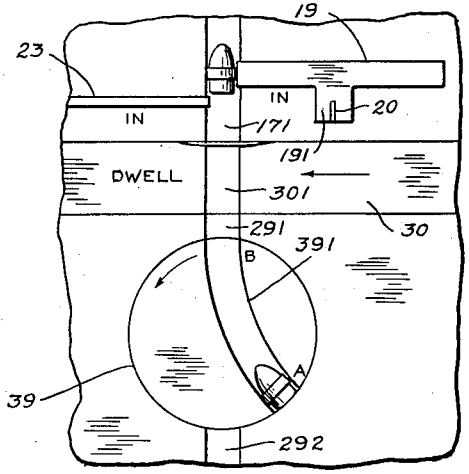
Fig. 10
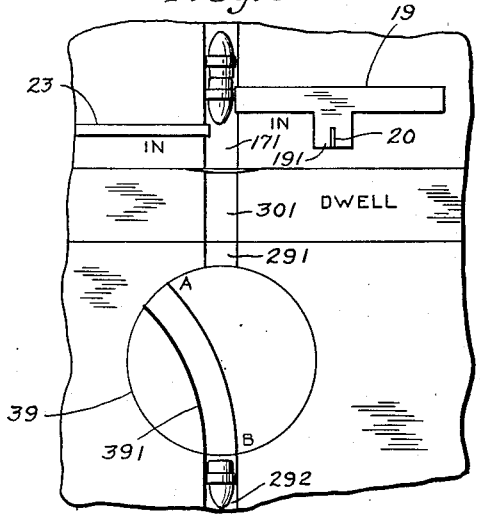
Fig. 11
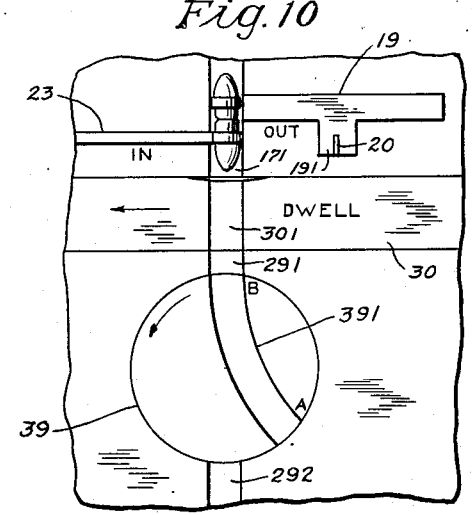
Fig. 12
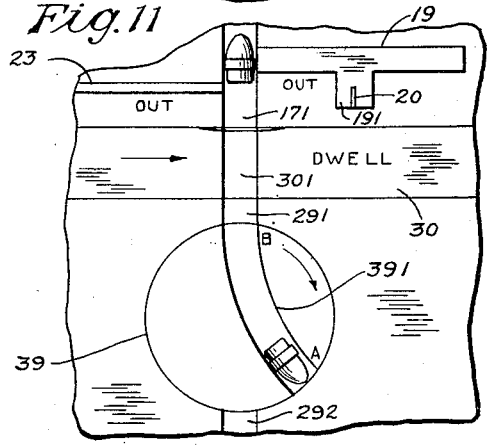
Fig. 13
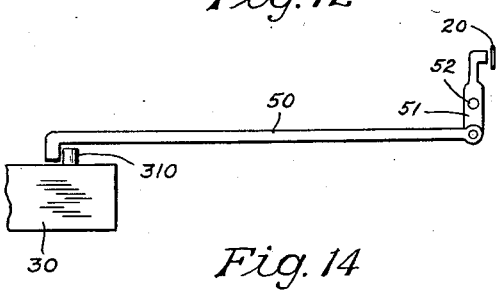
Fig. 14
INVENTOR.
ALBERT W. G. ERVINE
BY
ATTORNEYS

United States Patent Office 2,759,631
Patented Aug. 21, 1956

2,759,631

WORKPIECE ORIENTING DEVICE

Albert W. G. Ervine, Bridgeport, Conn., assignor to Remington Arms Company, Inc., Bridgeport, Conn., a corporation of Delaware Application September 5, 1952, Serial No. 308,032

14 Claims. (Cl. 221—173)

This invention relates to devices for delivering a series of dimensionally asymmetric workpieces in a predetermined position of orientation. Elongated workpieces which comprise a longitudinal section of a transverse dimension less than that of another longitudinal section are received in column either end up and are delivered in uniform orientation, either large-end-down or small-end-down. The particular embodiment of the invention to be described contemplates the delivery of workpieces such as projectiles into tubular passages carried by a continuously revolving turrent, from which passages the projectiles are transferred to receptacles on a chain conveyor which traverses and either drives or is driven by the turret. A machine of this type is illustrated and described in the patents to Reynolds et al., Nos. 2,538,706 and 2,538,707, January 16, 1951. The machine of Patent No. 2,538,707 contemplates the delivery of symmetrical slugs which in the machine itself are swaged into projectile shape. Where projectiles are made from pulverulent material it is more desirable to form the finished projectiles in a separate machine of known type and to feed them as finished projectiles into receptacles on a conveyor chain which conducts them to the loading machine.

The present invention contemplates receiving projectiles or other workpieces in column from a supply hopper and, by means of certain stops and detents, one of which will retain the workpiece only by engagement with a large diameter section, to deliver the workpieces one at a time to an orienting wheel. The orienting wheel comprises an off-center workpiece passage, and its movement is so synchronized with that of the stops and intermediate devices that all workpieces are delivered therefrom in the same orientation, either large-end-down or small-end-down, as desired.

Figure 1:
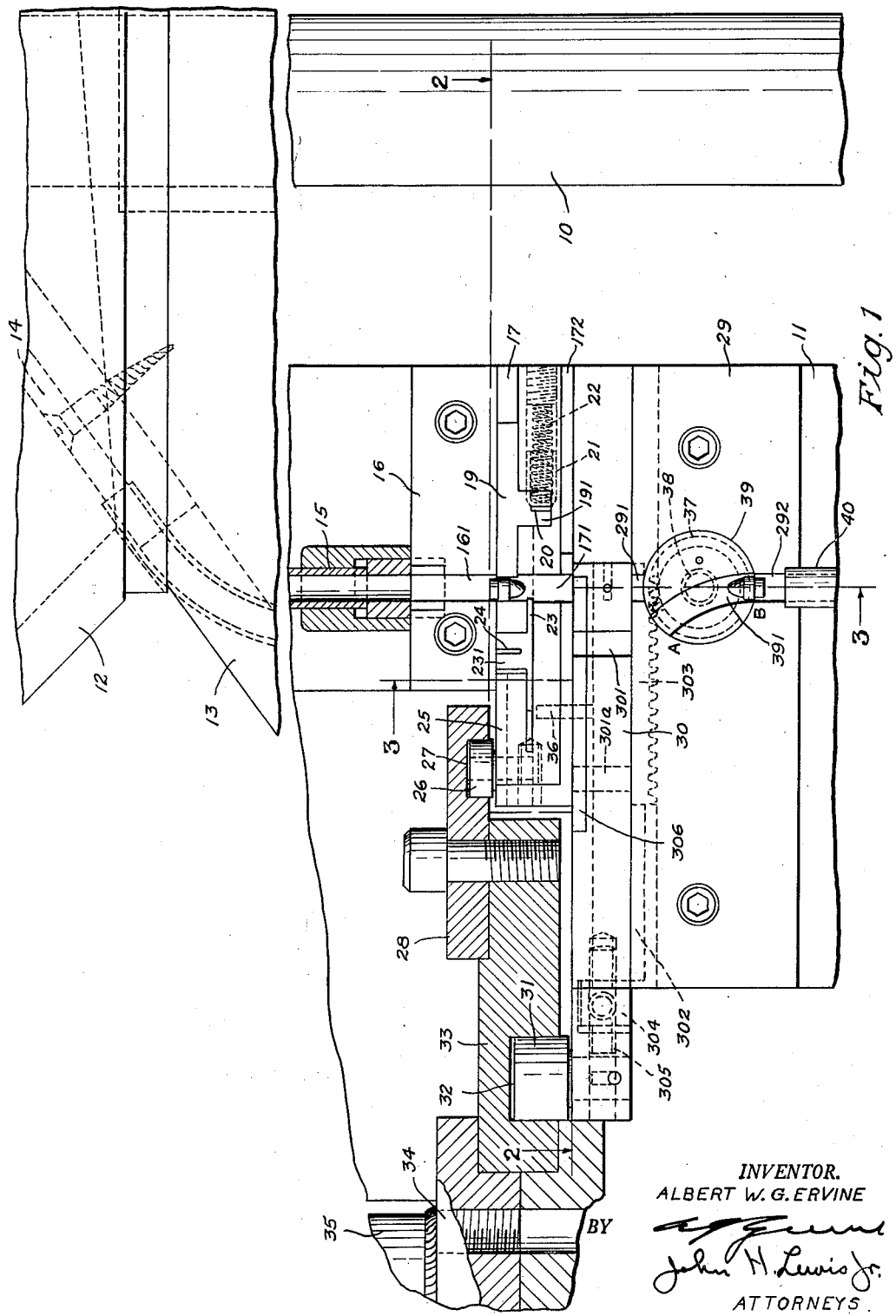
Fig. 1 is a fragmentary sectional elevation showing the application of the invention to a machine of the type above mentioned. The section is substantially on the line 1—1 of Fig. 3.

Figs. 4 to 8, inclusive, are diagrammatic representations of the orienting mechanism in its various positions during its cycle of movement.

Figs. 9 to 13, inclusive, are a series similar to Figs. 4 to 8, inclusive, but showing an arrangement for delivering workpieces small-end-down instead of large-end-down.

Fig. 14 is a detached view of a modified form of connections for operating the workpiece stop to effect delivery of workpieces small-end-down.

While the orienting device of this invention is susceptible to use in many ways, it has been illustrated as applied to the continuously revolving turret machine or unit of an assembly machine. Such a machine may comprise a fixed post or pedestal 10 which serves as an axis about which there revolves a turret frame identified generally by numeral 11. On the revolving turret frame are placed several, say 12, identical units, each unit comprising cam followers which engage fixed ring-shaped cams. The followers of each of the units are thus each actuated in turn by the active surfaces of a single fixed cam. One unit only will be described, since all are identical. Secured adjacent the top of the fixed pedestal 10 is a hopper body, a fragment of which is shown as 12. Into the open bottom of this hopper body projects a frusto-conical hopper bottom 13 which is secured to and revolves with the turret. The revolving hopper bottom comprises radial grooves 14 (as more fully described in the aforementioned Patent No. 2,538,706) of such width as to receive the transverse dimension but not the longitudinal dimension of the workpieces. The workpieces are thus aligned in the grooves in column but may enter the grooves either end up. Each groove 14 communicates and delivers a column of workpieces to a tubular passage 15 through which the workpieces fall by gravity to an orienter assembly.

Each orienter assembly, one of which will be described, is secured by suitable means to the turret frame 11. Each tubular passage 15 communicates with a passage or notch 161 in the margin of a cover block 16, which notch in turn communicates with a passage 171 in the margin of a stop-and-detent mounting block 17. There is a passage 171 in each lateral margin of each cover block 16 and mounting block 17 and a corresponding duplex arrangement of the passages and control devices described and to be described, all as clearly illustrated in Figs. 2 and 3. Each side of the orienter assembly is faced with a cover sheet 18 which completes the workpiece passages in cover block 16 and mounting block 17, and others to be described.

Mounting block 17 is apertured and recessed to receive stop and detent devices which control the movement of workpieces through the passages 171. One of these devices comprises workpiece stops 19 placed in cut-outs in the rear (right) upper portions of mounting block 17 and adapted to project into the passages 171 to retain a workpiece therein regardless of its position of orientation and thereby support and retain the entire column of workpieces in the juxaposed tubular passage 15. Each stop 19 comprises a downwardly extending foot 191 slotted to receive the end portion of a connector piece 20 which is preferably a spring steel strip. A spring-follower 21 urged leftwardly by a spring 22 holds the two stops 19 in their advanced workpiece stopping position until they are displaced to permit the passage of workpieces by means to be described.

Somewhat below the plane of each stop 19 and entering the passage 171 from the opposite side is a detent 23. Each detent occupies a recess in a margin of mounting block 17 and comprises an upwardly extending lug 231 which is transversely slotted to receive the end of a spring connector strip 24. The mid-portion of strip 24 is received in a slot in a detent actuator 25 which occupies a T-slot in the upper-mid-portion of mounting block 17. Secured to detent actuator 25 is a cam follower 26 received in a cam track 27 in a fixed ring-shaped cam 28. The configuration of cam track 27 is such as to operate detents 23 through the sequence of IN and OUT positions illustrated in the drawings, and to be further discussed.

In vertical alignment with but vertically spaced from the mounting block 17 is a support block 29, and the space between the under-surface of mounting block 17 and support block 29 is occupied by a slide assembly comprising a radially reciprocable slide 30. Slide 30 is longitudinally recessed to receive a rack carrier 302 to which is secured a rack 303 reciprocating in an upwardly facing recess in support block 29 which is in vertical alignment with the recess in slide 30. An adjustment between slide 30 and the rack assembly 302—303 may be provided by forming in the end of rack carrier 302 a slot which embraces a pin secured in the block 30 and by providing the opposite end of the rack carrier with a head 304 comprising an aperture which is threaded to receive a stud 305 rotatably held in the slide 30. Secured adjacent the radially outwardly projecting end of slide 30 is a cam follower 31 embraced by a cam track 32 in a fixed ring-shaped cam member 33 which, as illustrated, serves as a support for cam 28 and is itself secured to a fixed ring-shaped member 34. Ring 34 may be supported from the fixed base of the machine (not shown) or by posts, a fragment of which is shown as 35 depending from the support for the fixed hopper 12.

Figure 3:
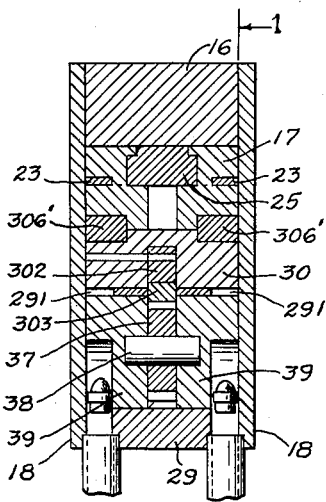
Fig. 3 is a fragmentary sectional elevation substantially on the line 3—3 of Fig. 1, and shows a modification adapted to handle shorter workpieces than the Fig. 1 form.
Figure 6:
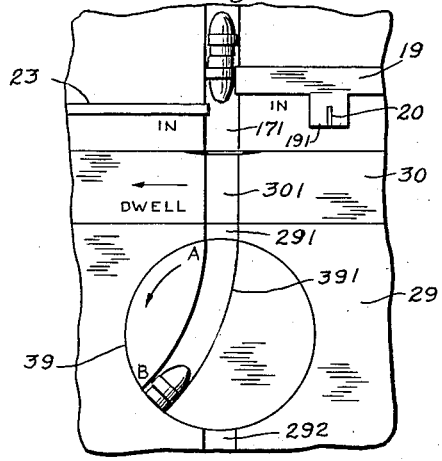

Slide 30 comprises in its margins workpiece passages or cut-outs 301, which in one radial position of the slide are aligned with the passages 171, as shown in Figs. 6 and elsewhere, to receive a workpiece therefrom. One function of the slide is to retract the workpiece stops 19, and to this end a stud 36 (Figs. 1 and 4) projecting upwardly from the slide traverses a groove in mounting block 17 as the slide moves radially, and near the end of the inward movement of the slide engages the midportion of spring strip 20 which joins the two stops 19 associated with each mounting block, displacing the stops out of passage 171. An arrangement is contemplated whereby, by the alteration of easily removable parts, the machine may be adapted to handle workpieces of varying length. To this end, the lower marginal portions of mounting block 17 are cut away, and the recesses thus formed are occupied by shims or strips 172 which, to facilitate attachment and removal, may comprise upturned end portions. Each shim 172 is notched in line with the notches 171 to provide the workpiece passage. The upper lateral portions of slide 30 are similarly notched and the notches occupied by filler blocks 306. As shown in Fig. 1, the upper faces of filler blocks 306 are flush with the top of the slide block and the shims 172 are in place on the mounting block. As shown in Fig. 3, the shims 172 have been removed and the filler blocks 306 have been replaced by thicker blocks 306' which fill the space otherwise occupied by shims 172. The upper surfaces of filler blocks 306 and 306' respectively afford a support for maintaining long and short workpieces in proper relation to the detents 23 and the stops 19.

Rack 303 engages a pinion 37 secured to an arbor 38 having secured thereto orienting wheels 39, the assembly of pinion, arbor and orienting wheels occupying suitably shaped recesses in support block 29. Each orienting wheel comprises in its outer face an off-center workpiece receiving channel 391. It will be obvious that the orienting wheels rotate back and forth or "reciprocate" in unison with the slide, and the relationship of cut-outs 301 and channels 391 is such that when cut-outs 301 is in alignment with passage 171 it is also in alignment with one end of channel 391, as shown in Fig. 6 and elsewhere. An aperture 291 in the upper portion of support block 29 affords communication from cut-out 301 to channel 391. An aperture 292 through the lower portion of the support block communicates with a delivery tube 40 and in certain positions of orienting wheel 39 with one end of channel 391 therein.

Figure 4:
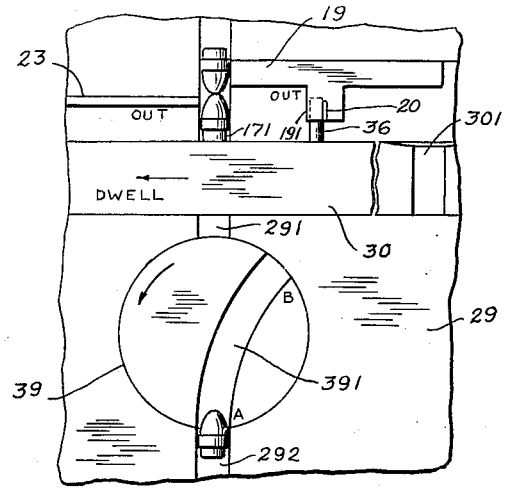
Figure 5:
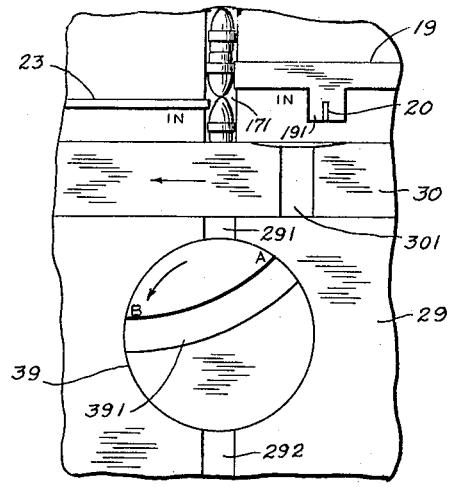

The timing and movement of a stop 19, associated detent 23, slide 30 and orienting wheel 39, by which workpieces are presented to and delivered from the orienting wheel to the exit aperture 292 and delivery tube 40 under different conditions, will be described with reference to Figs. 1 and 4 to 13, inclusive. In Figs. 1 and 4 to 8, the workpieces are delivered large-end-down. Figs. 4, 5, 6 and 1, in order, show the movement of a workpiece which is received large-end-down and is not inverted by the orienting wheel. It is necessary to distinguish between the two ends of the channel 391 through the orienting wheel, since a workpiece which is not inverted enters this passage at one end and leaves from the opposite end, while a workpiece which is inverted enters and leaves from the same end. The two ends of said passage are identified on the drawings as A and B. Fig. 4 shows the slide 30 in its radially innermost position, the post 36 has contacted the stop operator 20, withdrawing the stops 19. The configuration of cam track 27 is such that at this time detent 23 is also retracted, so that the lowermost workpiece in the column comes to rest on the upper surface of slide 30. The orienting wheel 39 has the position shown, neither end of channel 391 being in alignment with the entrance aperture 291—the lowermost workpiece in passage 171 is assumed to be large-end-down, as illustrated. The movement of the slide from this position is radially outward or to the left in the drawings, and the accompanying rotation of orienting wheel 39 is counter-clockwise. Fig. 5 shows the mechanism at an intermediate point in the radially outward travel of the slide block at which point cut-out 301 is approaching but has not reached alignment with passage 171. Stop 19 is in engagement with the second workpiece in the column, and supports all workpieces thereabove.

Figure 2:
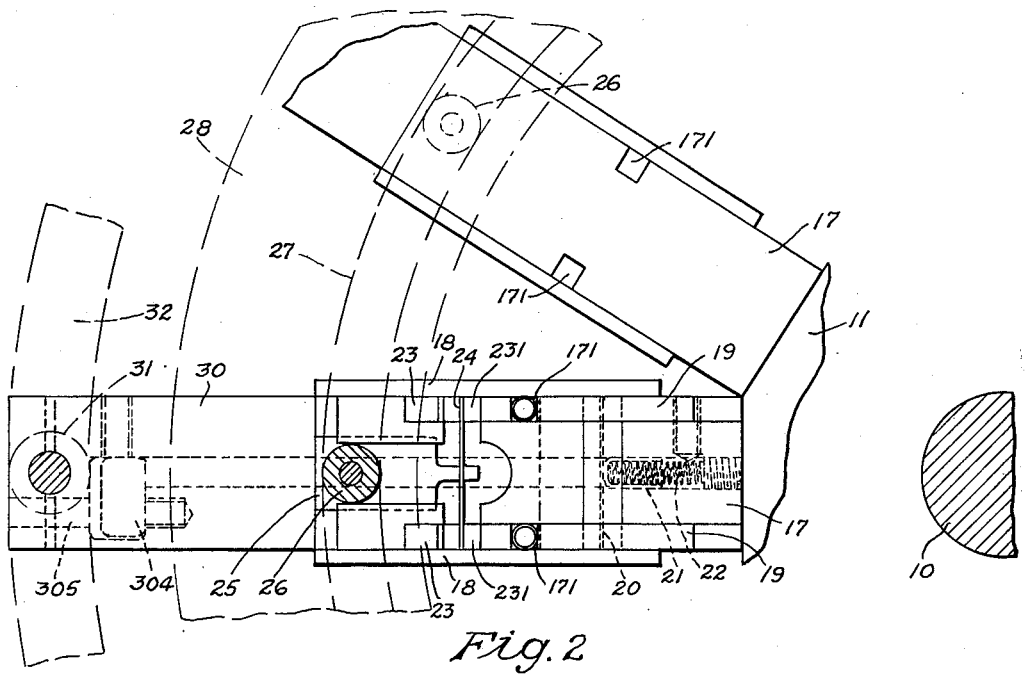
Fig. 2 is a fragmentary horizontal section, substantially on the line 2—2 of Fig. 1. The cam tracks and cam followers which are above the plane of this figure have been indicated in broken lines.

An important feature of the invention is the relation of detent 23 to the reduced diameter portion of the workpiece, as illustrated in Fig. 5. Said detent is so constructed and controlled that it will engage the larger diameter of a workpiece and thereby retain such workpiece, but is incapable of engaging the smaller diameter of the workpiece in such a manner as to retain it. Fig. 5 shows the detent in its innermost position, opposite a small diameter of the workpiece and not in holding engagement with the workpiece. Further inward movement of the detent is stopped by the engagement of the margin of the upwardly extending lug 231 thereon with the margin of a transverse slot in mounting block 17, as shown in Figs. 1 and 2.

The workpiece is thus free to drop through cut-out 301 and into the orienting wheel channel 391 as soon as these passages are aligned with passage 171 and aperture 291. This position of the mechanism is shown in Fig. 6, the workpiece having entered channel 391 through the A-end and come to rest against the periphery of the recess in support block 29 in which the orienting wheel is mounted. Cam track 32 comprises a dwell which stops the slide and orienting wheel at this point long enough to permit such movement of the workpiece. Thereafter, the slide and the orienting wheel complete their outward and counter-clockwise movement to the position shown in Fig. 1, in which the B-end of channel 391 is in alignment with the exit aperture 292 through which the workpiece drops into delivery tube 40 in large-end-down position. Slide 30 and orienting wheel thereafter return to the Fig. 4 position, without any workpiece movement.

Figure 7:
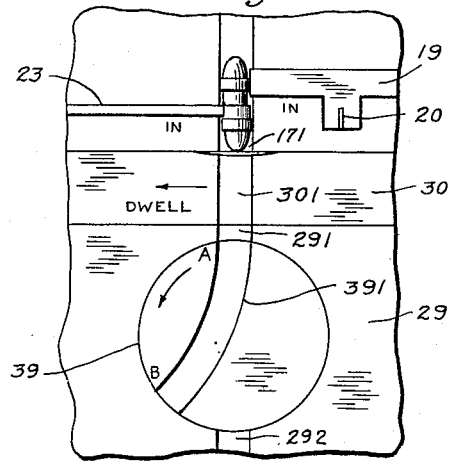
Figure 8:
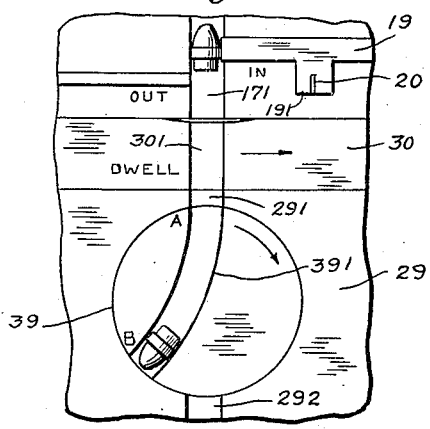

Figs. 7, 8 and 4, in order, show the movement of a workpiece which is presented to the slide small-end-down. Assume that the uppermost workpiece as shown in Fig. 4 small-end-down has been dropped onto the slide in the manner heretofore described. Slide and orienting wheels move outwardly and counter-clockwise, as above described, until cut-out 301 and the A-end of channel 391 are in alignment with the delivery passage 171, as shown in Fig. 7, this being the same position as Fig. 6 but with the lowermost workpiece small-end-down. The detent 23 is projected into passage 171, where it engages the large diameter portion of the workpiece and thus holds it, instead of permitting it to drop into the orienting wheel. Slide and orienting wheel thereafter complete their leftward and counter-clockwise movement and return to the position in which the workpiece passages are aligned, as shown in Fig. 8. At this point in the radially inward movement of the slide and the clockwise rotation of the orienting wheel, cam track 27 is so formed as to withdraw the detent 23, permitting the workpiece to drop through the A-end of channel 391 and come to rest small-end-down against the periphery of the orienting wheel receiving recess. As before, cam track 32 comprises a dwell which halts the movement of slide and orienting wheel in the Fig. 8 position. Thereafter, the slide continues its inward movement and the orienting wheel its clockwise rotation, bringing the parts to the position shown in Fig. 4. The orienting wheel has rotated 180° from the Fig. 4 position, bringing the A-end of channel 391 into alignment with the exit aperture 292, and the workpiece is delivered large-end-down, as shown in Fig. 4.

Figs. 9 to 13 illustrate a modification in which the workpiece is delivered small-end-down, instead of large-end-down. This requires only a change in the location of cut-out 301 lengthwise of the slide 30, and a change in the timing of the cams. For convenience in making these alterations, slide 30 may be made with two pairs of cut-outs 301, and the shims 172 and filler blocks 306 or 306' correspondingly notched. Either set of notches and cut-outs may be blocked by means of a filler piece 301ᴬ (Fig. 1), which may be shifted from one cut-out to the other, as desired. Moreover, for use at moderate speeds, a single cam 33 may be provided with the active surfaces and dwells required by either cut-out. For high speed production, separate cams are preferred.

Fig. 9, like Fig. 4, shows the slide block in its radially innermost position. As before, both stop 19 and detent 23 are out and a workpiece large-end-down rests upon the upper surface of the slide. The B-end of channel 391 has been rotated clockwise past the position in which it can receive a workpiece from passage 291, and the cut-out 301 is so located in the length of slide 30 that it will be aligned with passage 171 when the orienting wheel has been rotated counter-clockwise to place the B-end of channel 391 in alignment with passage 171. This position is illustrated in Fig. 10. Both stop and detent are "in" position, but the workpiece stands with a small diameter portion opposite the detent so that the workpiece is free to drop into channel 391 to a position at the A-end thereof. Cam track 32 comprises a dwell at this point. Thereafter, the slide block moves radially outward and the orienting wheel counter-clockwise to the Fig. 11 position, in which the B-end of channel 391 is in alignment with exit aperture 292 and the workpiece is delivered small-end-down, as shown, having been inverted from the large-end-down position in which it was received.

If, the slide being in its innermost position, the lowermost workpiece is small-end-down, movement of the slide and orienting wheel outward and counter-clockwise to the Fig. 10 position aligns the workpiece passages as before, but detent 23, being in "in" position, engages a large diameter section of the workpiece and retains it, as shown in Fig. 12. Slide and orienting wheel perform their outward and counter-clockwise movements without incident and return to the Fig. 12 position but at this time cam track 27 has withdrawn the detent so that the lowermost workpiece drops into the channel 391 through the B-end, movement of the parts being halted as before. Thereafter, the slide completes its radially inward movement to the Fig. 9 position, in which the A-end of channel 391 is in alignment with the exit aperture 292, permitting the delivery of the workpiece small-end-down.

Another way of adapting the machine to small-end-down delivery is to provide connections (Fig. 14) for withdrawing the stop 19 at the outer end of the movement of slide 30 instead of at the inner end of such movement, as above described. A lug 310 on slide 30 is adapted to engage the downturned end of a link 50 which lies in a recess in the mounting block and is pivotally connected to a lever 51 carried on a stud 52 held in said mounting block. The opposite end of lever 51 engages the mid-portion of stop-connector 20, to displace stops 19 to ineffective position as slide 30 approaches its outermost position. A large-end-down workpiece enters the orienting wheel when in the Fig. 7 position and is delivered in the Fig. 4 position, while a small-end-down workpiece, held by detent 23 at Fig. 4 position, rides the top of slide 30 until the slide returns to the Fig. 8 position, when the workpiece drops into channel 391, to be delivered therefrom at the Fig. 1 position. Other variations of the structure as described may be made within the scope of the appended claims.

What is claimed is:

1. Apparatus for receiving dimensionally asymmetric workpieces in a mixed orientation and delivering such workpieces in uniform orientation, said apparatus comprising a mounting block having a passage therein to receive a column of workpieces in mixed orientation, an orienting wheel, means for supporting said orienting wheel in radial alignment with said passage, a reciprocable slide transecting said passage before said orienting wheel and adapted to releasably support a lead workpiece of said column, said slide having a workpiece releasing cut-out disposed to register with said passage in each direction of reciprocation, means for reciprocating said slide, means coupling said orienting wheel to said slide for counter-rotation in unison with the reciprocation of said slide, a releasable detent held in said block and disposed to laterally enter said passage by an amount sufficient to engage and retain at said slide a workpiece of one orientation while not engaging or retaining a workpiece of opposite orientation.

2. Apparatus according to claim 1, in which said orienting wheel comprises a workpiece receiving channel, the ends of said channel intersecting the periphery of said wheel at points less than 180° apart.

3. Apparatus according to claim 2, in which said coupling means simultaneously effect the alignment of one end of said channel with said cut-out and the alignment of said cut-out with said passage.

4. Apparatus according to claim 3, in which the slide reciprocating means comprises devices adapted to temporarily stop the movement of said slide when the passage, cut-out and channel are in alignment.

5. Apparatus according to claim 4, comprising means for so controlling said detent that said detent is in workpiece engaging position when said passage, cut-out and channel end are aligned as an incident to the movement of said slide and said orienting wheel in one direction, and said detent is retracted from workpiece engaging position when said passage, cut-out and channel are aligned as an incident to the movement of said slide and said orienting wheel in the reverse direction.

6. Apparatus according to claim 5, comprising a delivery passage in said orienting wheel support means, said passage being traversed by the ends of said channel as an incident to the movement of said orienting wheel.

7. Apparatus according to claim 6, in which said slide reciprocating means comprises devices adapted to temporarily stop the movement of said slide and said orienting wheel when the end of said channel is in alignment with said delivery passage.

8. Apparatus according to claim 7, comprising a second cut-out in said slide, one of said cut-outs being positioned for alignment between said passage and one end of said channel, and a second cut-out being positioned for alignment between said passage and the opposite end of said channel.

9. Apparatus according to claim 8, comprising a cut-out closing filler piece disposed in a surface recess of said slide and adapted for optional use in either of said cut-outs.

10. Apparatus according to claim 7, comprising means for so correlating the movements of said detent, said slide and said orienting wheel that a workpiece received in one end of said channel in the desired orientation is delivered from the opposite end of said channel and a workpiece received in one end of said channel in reverse orientation is delivered from the same end of the channel in the desired orientation.

11. Apparatus according to claim 1, in which said coupling means comprises a rack secured to said slide and engaging a pinion secured to said orienting wheel.

12. Apparatus according to claim 1, comprising detent release means synchronized with said slide reciprocating means for operation in one direction of reciprocation of said slide.

13. Apparatus for receiving dimensionally asymmetric workpieces in a mixed orientation and delivering said workpieces in uniform orientation, comprising an orienting wheel having therein a workpiece receiving channel comprising open ends intersecting the periphery of said wheel at points less than 180° apart, a fixed housing for said orienting wheel, an aperture through said housing for delivering workpieces to said channel, an aperture through said housing for receiving workpieces from said channel, means for controlling the delivery of workpieces to said orienting wheel, and synchronized means for so controlling the rotation of said orienting wheel that a workpiece received in one end of said channel in the desired orientation is delivered from the opposite end of the channel in the same orientation and a workpiece received in one end of said channel in the reverse orientation is delivered from the same end of the channel in the desired orientation.

14. Apparatus for receiving elongated workpieces each comprising two different transverse dimensions in a mixed orientation and delivering such workpieces in uniform orientation, said apparatus comprising a passage for a column of workpieces in mixed orientation, a shiftable detent cooperating with said passage and adapted to temporarily retain therein workpieces of one orientation while leaving free workpieces of another orientation, an orienting wheel comprising a workpiece receiving channel intersecting the periphery of said wheel at points less than 180° apart, a reciprocating slide interposed between said passage and said orienting wheel and comprising a plurality of optionally usable cut-outs affording a passage for workpieces from said first-named passage to said channel, and means for reciprocating said slide and said orienting wheel in unison, said cut-outs respectively being so related to said channel as to effect the delivery of workpieces from said orienting wheel in either of two desired positions of orientation.

References Cited in the file of this patent

UNITED STATES PATENTS

| | | |
|---|---|---|
| 620,350 | McGrail | Feb. 28, 1899 |
| 639,431 | Pondorf | Dec. 19, 1899 |
| 1,347,851 | Haefele | July 27, 1920 |
| 1,857,815 | Lafferty | May 10, 1932 |
| 2,590,710 | Klopak | Mar. 25, 1952 |